United States Patent [19]

Suzuki et al.

[11] Patent Number: 4,849,997

[45] Date of Patent: Jul. 18, 1989

[54] TIMING SIGNAL REGENERATOR FOR PHASE-ADJUSTING A RECEPTION TIMING SIGNAL WITH A TRANSMISSION TIMING SIGNAL GIVEN A PREDETERMINED FREQUENCY

[75] Inventors: Atsumi Suzuki, Tokyo; Kazunori Masuda, Shizuoka, both of Japan

[73] Assignee: NEC Corporation, Tokyo, Japan

[21] Appl. No.: 118,676

[22] Filed: Nov. 9, 1987

[30] Foreign Application Priority Data

Nov. 8, 1986 [JP] Japan .................................. 61-264889

[51] Int. Cl.[4] .............................................. H04L 7/00
[52] U.S. Cl. ........................................ 375/118; 375/8; 375/42; 375/67; 375/83; 331/1 A
[58] Field of Search .................... 375/106, 8, 9, 41, 42, 375/67, 83, 118; 331/1 A

[56] References Cited

U.S. PATENT DOCUMENTS 3,883,806  5/1975  Delong et al. ..................... 375/83 X
4,677,645  6/1987  Kaniwa et al. ..................... 375/8 X
4,737,967  4/1988  Cahalan ................................. 379/9
4,788,696 11/1988  Sakane et al. ...................... 375/42 X

*Primary Examiner*—Derek S. Jennings

*Attorney, Agent, or Firm*—Sughrue, Mion, Zinn, Macpeak & Seas

[57] ABSTRACT

In a timing signal regenerator of a modem which receives a reception modulated signal in a digital communication network, first and second timing signals are generated with the second timing signal generated at first for use as a local timing signal of a predetermined frequency. An A/D converter (26) converts the reception modulated signal to a digital modulated signal in synchronism with the local timing signal. A processor (27) processes the digital modulated signal into a discrete signal in synchronism with the first timing signal. From the discrete signal, an extractor (28) extracts phase error information which becomes at first to be related to a first phase difference between the first timing signal and the reception modulated signal and phase-controls the first timing signal into a reception timing signal. Controlled by a control signal, the reception timing signal is kept in phase synchronism with the reception modulated signal. Furthermore, the phase error information becomes to be related to a second phase difference between the second timing signal and the reception timing signal and frequency-controls the second timing signal into a transmission timing signal which is in frequency synchronism with the reception modulated signal. Preferably, the phase synchronism is decided by the second phase difference.

2 Claims, 4 Drawing Sheets

TIMING SIGNAL REGENERATOR FOR PHASE-ADJUSTING A RECEPTION TIMING SIGNAL WITH A TRANSMISSION TIMING SIGNAL GIVEN A PREDETERMINED FREQUENCY

BACKGROUND OF THE INVENTION

This invention relates to a timing signal regenerator for use in a modem of a difital communication network.

A digital communication network is operable in a predetermined one of an independent synchronization scheme and a dependent synchronization scheme. In a didital communication network of the dependent synchronization scheme, a timing signal regenerator is used in the modem of each slave station of the communication network. The modem is for modulating a carrier signal by transmission digital data into a transmission modulated signal for transmission to other modem or modems of the communication network and for demodulating a reception modulated signal received at the modem under consideration into reception digital data. The timing signal regenerator is for regenerating a reception timing signal from the reception modulated signal in phase synchronism with the reception modulated signal and for generating a transmission timing signal in frequency and phase synchronism with the reception timing signal. The reception timing signal is used in demodulating the reception modulated signal into the reception digital data. The transmission timing signal is used in modulating the carrier signal into the transmission modulated signal.

In the manner which will be described more in detail later in the following, a conventional timing signal regenerator comprises a reception timing signal generator for generating a first timing signal. A transmission timing signal generator generates a second timing signal. A phase error information extractor produces a first phase error information signal representative of first phase error information related to a first phase error which the first timing signal has relative to the reception modulated signal. The first phase error information signal is used in adjusting the first timing signal into the reception timing signal. A phase error information detector produces a second phase error information signal representative of second phase error information related to a second phase error which the second timing signal has relative to the reception timing signal. The second phase error information signal is used in adjusting the second timing signal into the transmission timing signal.

The transmission timing signal generator may comprise a voltage controlled oscillator. In this event, the second phase error information signal is used in controlling the voltage controlled oscillator to adjust the frequency of the second timing signal and thereby to adjust the phase of the second timing signal. As a consequence, it takes a long period of time in achieving the frequency and phase synchronism. Alternatively, the transmission timing signal generator may be operable in a phase locked loop. In this case, the second phase error information signal is discontinuously used in adjusting the frequency of the second timing signal to thereby attain the frequency and phase synchronism. As a result, jitter in inevitable in the transmission timing signal.

SUMMARY OF THE INVENTION

It is therefore an object of the present invention to provide a timing signal regenerator capable of rapidly regenerating a reception timing signal from a reception modulated signal and generating a transmission timing signal.

It is another object of this invention to provide a timing signal regenerator of the type described, which can generate the transmission timing signal without jitter.

Other objects of this invention will become clear as the description proceeds.

On describing the gist of this invention, it is possible to define that a timing signal regenerator is for use in a modem in regenerating a reception timing signal from a reception modulated signal in phase synchronism with the reception modulated signal and in generating a transmission timing signal in frequency synchronism with the reception modulated signal and comprises a first timing signal generator for generating a first timing signal and a second timing signal generator for generating a second timing signal.

According to this invention, the above-defined timing signal generator comprises (A) an analog-to-digital converter responsive to the second timing signal for converting the reception modulated signal to a digital modulated signal with the second timing signal used as a local timing, (B) a processor responsive to the first timing signal for processing the digital modulated signal into a discrete signal, (C) a controller for producing a control signal, (D) a contralable phase error information extractor coupled to the controller and responsive to the discrete signal for extracting phase error information from the discrete signal to produce a phase error information signal representative of the phase error information, (E) first adjusting means coupled to the first timing signal generator and to the controller for adjusting the first timing signal into the reception timing signal in response to the phase error information signal before production of the control signal, and (F) second adjusting means coupled to the second timing signal generator and to the controller for adjusting the second timing signal into the trnasmission timing signal in response to the phase error information signal after production of the control signal.

DESCRIPTION OF THE PREFERRED EMBODIMENT

Figure 1:
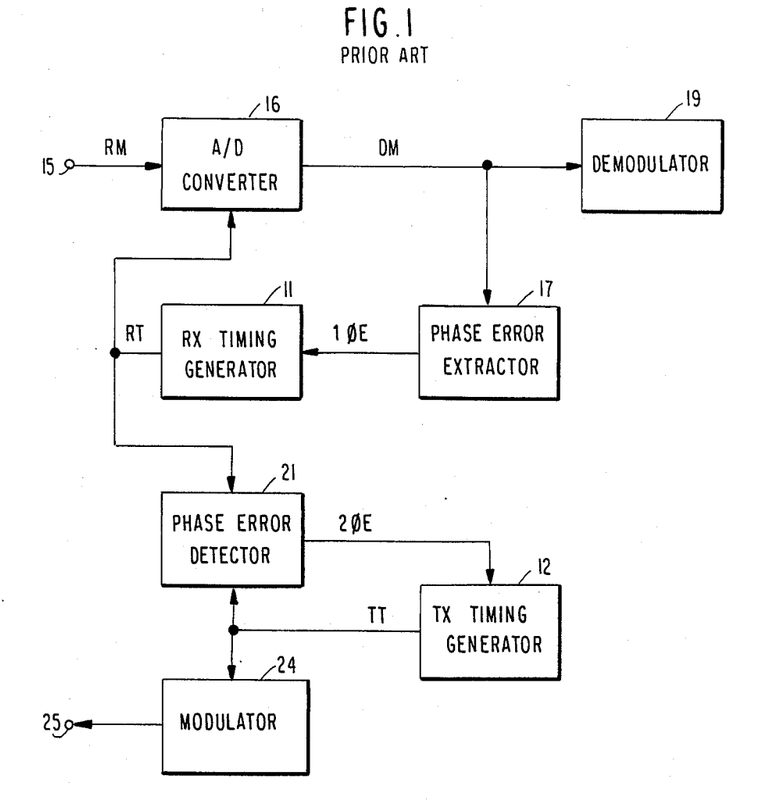
FIG. 1 is a block diagram of a modem including a conventional timing signal regenerator.

Referring to FIG. 1, a conventional timing signal regenerator will be described at first in order to facilitate an understanding of the present invention. In general, such a timing signal regenerator is used in a modem of a digital communication network. The modem is for modulating a carrier signal by transmission digital data into a transmission modulated signal which is trandmitted from the modem under consideration to other modem or modems of the communication network. The modem is furthermore for demodulating a reception modulated signal RM received by the modem in question into reception digital data. The timing signal regenerator is for regenerating a reception timing signal RT from the reception modulated signal RM in phase synchronism with the reception modulated signal RM and for generating a transmission timing signal TT in frequency and phase synchronism with the reception timing signal TT. The reception timing signal RT is used in demodulating the reception modulated signal RM into the reception digital data. The transmission timing signal Tt is used in modulating the carrier signal into the transmission modulated signal.

In FIG. 1, the timing signal regenerator comprises a reception timing generator 11 for generating a first timing signal. Inasmuch as the first timing signal becomes the reception timing signal RT in the manner which will presently be described, the first timing signal will be designated by the reference symbol RT. A transmission timing signal generator 12 is for generating a second timing signal. Like the first timing signal RT, the second timing signal will be indicated by the reference symbol TT.

The timing signal regeneratot receives the reception modulated signal RM at a regenerator input terminal 15. Responsive to the timing signal RT, an analog-to-digital converter 16 converts the reception modulated signal RM to a digital modulated signal DM in synchronism with the first timing signal RT. Supplied with the digital modulated signal DM, a phase error information extractor 17 extracts first phase information from the digital modulated signal DM. The first phase error information is related to a first phase error which the first timing signal RT has relative to the reception modulated signal RM. The phase error information extractor 17 thereby produces a first phase error information signal 1$\phi$E representative of the first phase error information.

The first phase error information signal 1$\phi$E is delivered to the reception timing signal generator 11 to eventually render the first timing signal RT in phase synchronism with the reception modulated signal RM. In this manner, the first timing signal is adjusted into the reception timing signal RT. The digital modulated signal DM is used in a demodulator 19 in demodulation of the reception modulated signal RM into the reception digital data which should be received at the modem being illustrated.

From the reception timing signal RT and the second timing signal TT, a phase error information detector 21 detects second phase error information related to a second phase error which the second timing signal TT has relative to the reception timing signal RT. The phase error information detector 21 thereby produces a second phase error information signal 2$\phi$E representative of the second phase error information.

The second phase error information signal 2$\phi$E is delivered to the transmission timing signal generator 12 to ulimately render the second timing signal TT in frequency and phase synchronism with the reception timing signal RT and therefore with the reception modulated signal RM. The second timing signal is thus adjusted into the transmission timing signal TT. A modulator 24 uses the transmission timing signal TT in modulating the carrier signal by transmission digital data into a transmission modulated signal. Through a regenerator output terminal 25, the transmission modulated signal is transmitted to other modem or modems of the digital communication network.

Figure 2:
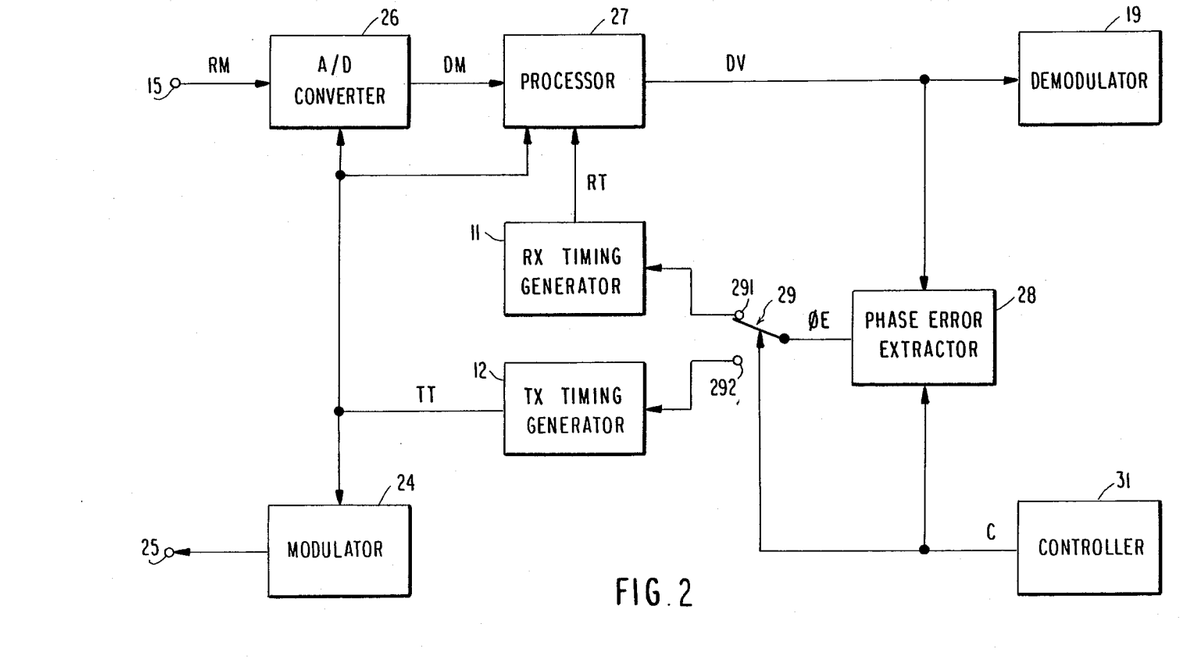
FIG. 2 is a block diagram of a modem which includes a timing signal regenerator according to an embodiment of the instant invention.

Referring now to FIG. 2, the description will proceed to a timing signal regenerator according to a preferred embodiment of this invention and used in a modem of a digital communication network. Similar parts are designated by like reference numerals and are for dealing with similar signals which are indicated by like reference symbols.

More particularly, a reception timing signal generator 11 generates a first or reception timing signal RT. A transmission timing signal generator 12 generates a second timing signal. It should, however, be noted that the second timing signal is used at first as a local timing signal of a predetermined frequency which is substantially equal to the frequency of the reception timing signal RT. More exactly, the predetermined frequency should be substantially equal to the frequency of a transmission timing signal used in a counterpart modem of the digital communication network in producing a modulated signal which is received as a reception modulated signal RM at a regenerator input terminal 15. At any rate, the second timing signal ultimately becomes a transmission timing signal TT of the modem being illustrated. The local and the second timing signals will therefore be designated by the reference symbol TT. Details of the reception and the transmission timing signal generators 11 and 12 will later be described.

In effect, a demodulator 19 demodulates the reception modulated signal RM into reception digital data in response to the reception timing signal RT. The transmission timing signal TT is used in a modem 21, among others, in modulating a carrier signal by transmission digital data into a transmission modulated signal for delivery to a regenerator output terminal 25.

Supplied with the local timing signal TT at first and then with the second timing signal TT from the transmission timing signal generator 12, an analog-to-digital converter 26 converts the reception modulated signal RM to a digital modulated signal DM in synchronism with the local or the second timing signal TT. It is true that the second timing signal becomes the transmission timing signal TT and is in frequency and phase synchronism with the reception timing signal RT after the timing signal regenerator reaches a steady state of operation. The fact should be noted in this connection that the analog-to-digital converter 26 is not controlled by the first timing signal RT but by the local, the second, or the transmission timing signal TT in contrast to the analog-to-digital converter 16 described in conjunction with FIG. 1. Depending on the circumstances, the analog-to-digital converter 26 may be called a regenerator analog-to-digital converter for the reason which will later become clear.

Supplied with the first timing signal RT from the reception timing signal generator 11, a processor 27 processes the digital modulated signal DM into a discrete signal DV in the manner which will shortly be described. The discrete signal DV is a digital signal having discrete values. In practice, the local timing signal TT is also supplied to the processor 17. Instead of the digital modulated signal DM, the discrete signal DV is delivered to the demodulator 19.

From the discrete signal DV, a phase error information extractor 28 extracts phase error infromation and produces a phase error infromation signal φE which is a digital signal representative of the phase error information. In the manner which will later be described, the phase error information is related to a first and a second phase error which the first and the second timing signals RT and TT have relative to the reception modulated signal RM, respectively. The phase error information extractor 28 makes use of a nonlinear characteristic of a multiplier in extracting the phase error information.

A switch 29, depicted as a mechanical switch merely for convenience of illustration, is used in delivering the phase error information signal φE selectively to the reception and the trasnmission timing signal generators 11 and 12. For this purpose, the switch 29 has first and second contacts 291 and 292 connected to the reception and the transmission timing signal generators 11 and 12. A controller 31 is for producing a control signal C as will later be described in detail. Controlled by the control signal C, the switch 29 delivers the phase error information signal φE at first to the reception timing signal generator 11 and subsequently to the transmission timing signal generator 12.

Figure 3:
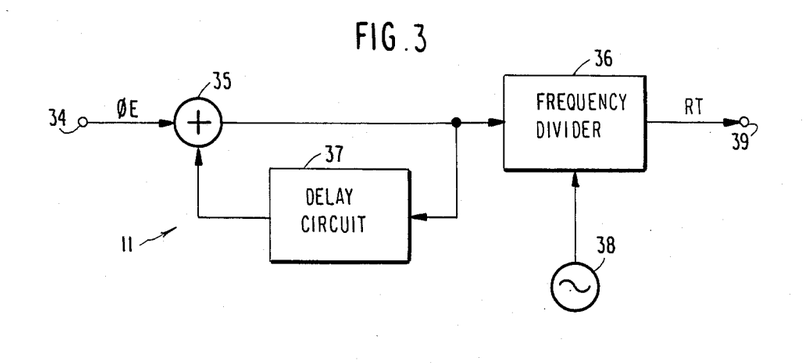
FIG. 3 is a block diagram of a reception timing signal generator for use in the timing signal regeneratot illustrated in FIG. 2.

Turning to FIG. 3, the reception timing signal generator 11 has a reception timing signal generator input terminal 34 supplied with the phase error information signal φE from the first contact 291 (FIG. 1). An adder 35 has an augend input terminal supplied with the phase error information signal φE. It will presently become clear that the adder 35 delivers a frequency division ratio signal to a first frequency divider 36. Responsive to the frequency division ratio signal, a delay circuit 37 delivers a delayed ratio signal to an addend input terminal of the adder 35. The delay circuit 37 is for accumulating a phase difference between the local timing signal TT and the reception modulated signal RM. For discrimination from other adders and delay circuits which will later be described, the adder 35 and the delay circuit 37 will be referred to as a generator adder and a generator delay circuit. The generator delay circuit 37 may be said to have a generator delay.

In the reception timing signal generator 11, an oscillator 38 generates a first high frequency signal. The first frequency divider 36 is for frequency dividing the first high frequency signal in compliance with the frequency division ratio signal into the first timing signal RT, which is delivered to a reception timing signal generator output terminal 39. A combination of the oscillator 38 and the first frequency divider 39 is herein termed a first signal generator. Operation of the reception timing signal generator 11 will later be described.

Figure 4:
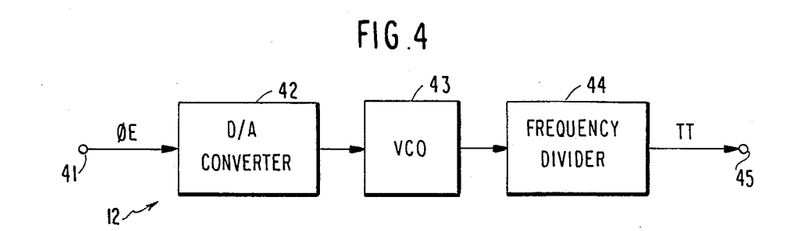
FIG. 4 is a block diagram of a transmission timing signal generator for use in the timing signal regenerator shown in FIG. 2.

Further turning to FIG. 4, the transmission timing signal generator 12 has a transmission timing signal generator input terminal 41 supplied with the phase error information signal φE from the second contact 292 (FIG. 1). A digital-to-analog converter 42 converts the phase error information signal φE to an analog error information signal. Controlled by the analog error information signal, a voltage controlled oscillator (VCO) 43 generates a second high frequency signal. A second frequency divider 44 is for frequency dividing the second high frequency signal into the local or the second timing signal TT, which is delivered to a transmission timing signal generator output terminal 54. The digital-to-analog converter 42 will be referred to alternatively as a generator digital-to-analog converter. A combination of the voltage controlled oscillator 43 and the second frequency divider 44 is herein called a second timing signal generator. Operation of the transmission timing signal generatot 12 will later become clear.

Figure 5:
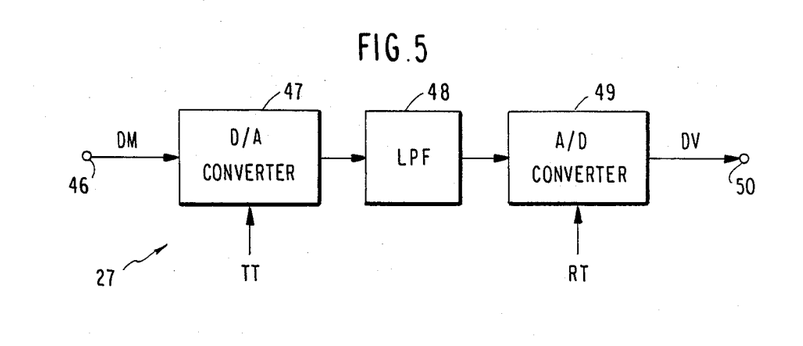
FIG. 5 is a block diagram of a processor for use in the timing signal regenerator depicted in FIG. 2.

Referring to FIG. 5, the processor 27 has a processor input terminal 46 supplied with the digital modulated signal DM from the regenerator analog-to-digital converter 26 (FIG. 2). Timed by the local timing signal TT at first and then by the second timing signal TT, a digital-to-analog converter 47 converts the digital modulated signal DM to an analog modulated signal. Responsive to the analog modulated signal, a low-pass filter (LPF) 48 produces a low frequency component of the analog modulated signal. Timed by the first timing signal RT, an analog-to-digital converter 49 converts the low frequency component to the discrete signal DV for delivery to a processor output terminal 50. The low-pass filter 48 will alternatively be referred to as a processor low-pass filter.

Figure 6:
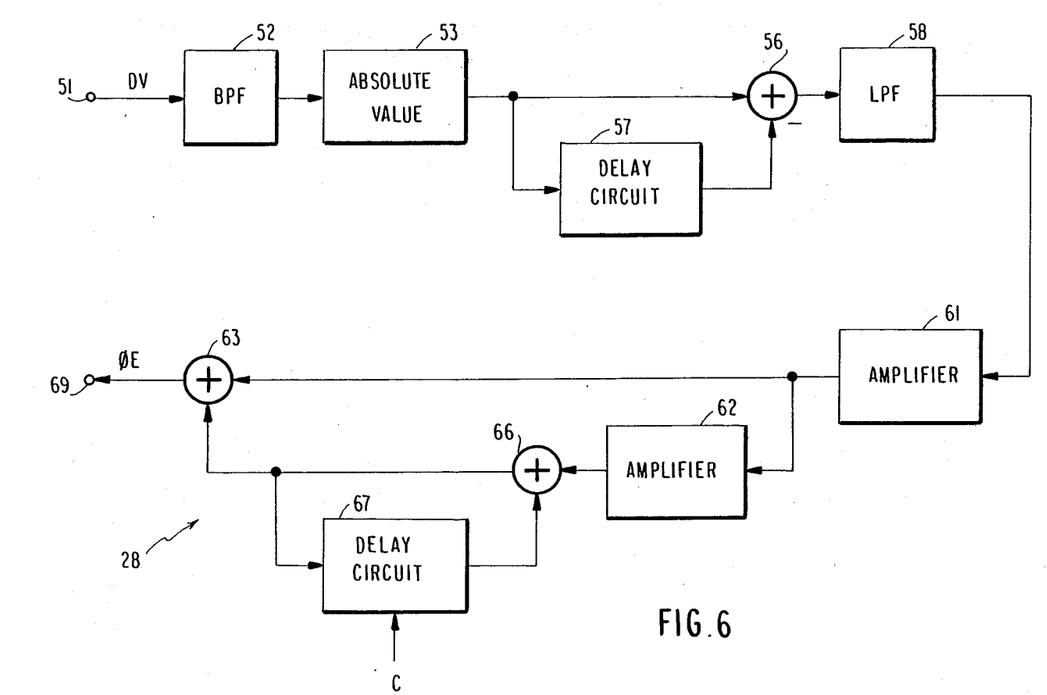
FIG. 6 is a block diagram of a phase error information extractor for use in the timing signal regenerator illustrated in FIG. 2.

Referring to FIG. 6, the phase error information extractor 28 has an extractor input terminal 51 supplied with the discrete signal DV from the processor 27 (FIGS. 2 and 5). The discrete signal DV is delivered to a band-pass filter (BPF) 52 which allows passage of the Nyquist frequency component of the discrete signal DV. A multiplier-adder 53 is used as an absolute value calculator for calculating an absolute value of the Nyquist frequency component and for producing an absolute value signal representative of the absolute value. The absolute value signal is delivered to an augend input terminal of a first adder 56 directly and to an addend input terminal of the first adder 56 through a first delay circuit 57 with a first delay which is equal to a quater period of the Nyquist frequency component. The first adder 56 therefore produces a frequency doubled signal. A low-pass filter (LPF) 58, which may be called an extractor low-pass filter, produces a low frequency component of the frequency doubled signal.

In the phase error information extractor 28, a first amplifier 61 amplifies the low frequency component of the frequency doubled signal into a first amplified signal, which is delivered to a second amplifier 62 and to an augend input terminal of a second adder 63. A third adder 66 has an augend input terminal supplied with a second amplifier output signal from the second amplifier 62 and delivers a sum signal to an addend input terminal of the second adder 63 and to a second delay circuit 67. Giving the sum signal a second delay which will soon be described, the second delay circuit 67 delivers a delayed signal to an addend input terminal of the third adder 66. The second adder 63 delivers the phase error information signal φE to an extractor output terminal 69. The second delay circuit 67 will alternatively be referred to as an extractor delay circuit. The second delay will similarly be called an extractor delay.

By way of example, the digital communication network is for transmitting modulated signals at a baud rate of 2,400 bauds per second among the modems of the communication network. In this event, the oscillator 48 of the reception timing signal generator 11 may generate the first high frequency signal at 16 MHz. The voltage controlled oscillator 43 may generate the second high frequency signal also at 16 MHz unless positively controlled by the analog error information signal. The processor low-pass filter 48 may produce the low frequency component below 2.4 kHz. The extractor low-pass filter 58 may produce the low frequency component which is also below 2.4 kHz. The predetermined frequency of the local timing signal TT should be 2.4 kHz. That is, the second frequency divider 44 should convert the second high frequency signal of 16 MHz to the local timing signal TT of 2.4 kHz.

In operation, attention will be directed to a training interval of time. During a former period of the training interval, the phase synchronism is established between the first timing signal RT and the reception modulated signal RM with the second timing signal TT kept at the predetermined frequency, namely, used as the local timing signal TT. It is possible to understand that the controller 31 produces the control signal C when a latter period of the training interval takes over the former period. It should be noted that the extractor delay circuit 67 is controlled by such a control signal. The phase error information extractor 28 is therefore a controllable phase error information extractor in contrast to the phase error information extractor 17 described in connection with FIG. 1.

During the latter period, the frequency synchronism is established between the second timing signal TT and the reception timing signal RT. In other words, the second timing signal TT is brought into frequency and phase synchronism with the reception modulated signal RM. After lapse of the training interval, the timing signal regenerator is in the steady state of operation.

At first in the former period of the training interval, the transmission timing signal generator 12 generates the second timing signal TT as the local timing signal at the predetermined frequency. During the former period, the switch 29 delivers the phase error information signal $\phi E$ to the reception timing signal generator 11 and not to the transmission timing signal generator 12. The local timing signal TT is kept at the predetermined frequency.

In the meantime, the extractor delay circuit 67 has an earlier delay which may be referred to alternatively as an earlier phase difference and becoses equal to a phase difference between the first timing signal RT and the reception modulated signal RM. The control signal C is produced at this instant of time. Incidentally, the phase difference may be termed a first phase difference. Likewise, the local or the second timing signal TT may be said to have a second phase difference from the reception modulated signal RM.

With the phase error information related to the earlier phase difference, the phase error information signal $\phi E$ eventually renders the generator delay of the generator delay circuit 37 equal to the second phase difference, namely, the phase difference between the local timing signal TT and the reception modulated signal RM. The first timing signal is now in phase synchronism with the reception modulated signal RM and is the reception timing signal RT.

It is possible to understand that a combination of the first contact 291, the generator adder 35, and the generator delay circuit 37 serves as a first circuit for making the phase error information signal $\phi E$ adjust the generator delay into the second phase difference. Inasmuch as the switch 29 is coupled to the controller 31, the first circuit is coupled to the controller 31. A connection between the generator adder 35 and the first frequency divider 36 serves as a second circuit responsive to the generator delay for adjusting the first timing signal into the reception timing signal RT. A combination of the generator delay circuit 37 and the first and second circuits serves as a first adjusting circuit coupled to the first timing signal generator and to the controller 31 for adjusting the first timing signal into the reception timing signal RT prior to production of the control signal C.

At first in the latter period of the training interval, the control signal C clears the extractor delay circuit 67. During the latter period, the switch 29 delivers the phase error information signal $\phi E$ to the transmission timing signal generator 12 and not to the reception timing signal generator 11. Meanwhile, the extractor delay circuit 67 has a later delay which may be called a later phase difference and becomes equal to the second phase difference.

It is now appreciated in connection with the phase error information extractor 28 that the extractor delay circuit 67 is for accumulating the earlier phase difference in response to the discrete signal DV before production of the control signal C and the later phase difference after production of the control signal C. The earlier phase difference becomes equal to the first phase difference immediately before production of the control signal C. Inasmuch as the switch 29 no more delivers the phase error information signal $\phi E$ to the reception timing signal generator 11, the generator delay of the generator delay circuit 37 is fixed at the second phase difference after production of the control signal C. Subsequently, the later phase difference becomes equal to the second phase difference. The former period of the training interval should be given a duration which is empirically decided. Typically, the duration is about 300 T, where T represents the inverse of the baud rate of the modulated signals. The controller 31 may comprise an adjuster (not shown) for manually or otherwise adjusting the duration.

The second timing signal generator of the transmission timing signal generator 12, namely, the combination of the voltage controlled oscillator 43 and the second frequency divider 44, may be considered as a single voltage controlled oscillator. Coupled to the single voltage controlled oscillator, the generator analog-to-digital converter 42 serves as a second adjusting circuit responsive to the phase error information signal $\phi E$ for adjusting the second timing signal into transmission timing signal TT after production of the control signal C. The second adjusting circuit comprises the second contact 292 and is therefore coupled to the controller 31.

It has been confirmed that the training interval is about one tenth of the long period of time which is necessary for conventional timing signal regenerators of the type illustrated with reference to FIG. 1. It is true that the phase error information signal $\phi E$ is a digital signal. The phase error information signal $\phi E$ is, however, continuously used in controlling the first timing signal RT to achieve the phase synchronism with the reception modulated signal RM. Moreover, the phase error information signal $\phi E$ is used in the transmission timing signal generator 12 in continuously controlling the single voltage controlled oscillator to attain the frequency synchronism of the second timing signal TT with the reception modulated signal RM. As a result, jitter is not present in the transmission timing signal TT.

While this invention has thus far been described in specific conjunction with a single preferred embodiment thereof, it will now be readily possible for one skilled in the art to carry this invention into effect in various other manners. For instance, the control signal C may have a first and a second value before and after lapse of the above-mentioned duration of about 300 T, respectively. In this instance, the extractor delay circuit 67 should be cleared when the control signal C is switched from the first value to the second. Incidentally, use of the first and the second amplifiers 61 and 62 in the phase error information extractor 28 is known in the art.

What is claimed is:

1. A timing signal regenerator for use in a modem in regenerating a reception timing signal from a reception modulated signal to phase synchronism with said reception modulated signal and in generating a transmission timing signal in frequency synchronism with said reception modulated signal, said timing signal regenerator comprising:
   - a first timing signal generator for generating a first timing signal and for adjusting said first timing signal into said reception timing signal in response to a phase error information signal;
   - a second timing signal generator for generating a second timing signal and for adjusting said second timing signal into said transmission timing signal in response to said phase error information signal;
   - an analog-to-digital converter responsive to said second timing signal for converting said reception modulated signal to a digital modulated signal with said second timing signal used as a local timing signal;
   - a processor responsive to said first timing signal for processing said digital modulated signal into a discrete signal;
   - a controller for producing a control signal; and
   - a controllable phase error information extractor coupled to said controller and responsive to said discrete signal for extracting phase error information from said discrete signal to produce a phase error information signal representative of said phase error information, which is supplied to said first and second timing signal generators 2. A timing signal regenerator as claimed in claim 1, wherein:
   said controllable phase error information extractor comprises an extractor delay circuit coupled to said controller for accumulating an earlier phase difference in response to said discrete signal before production of said control signal and a later phase difference in response to said discrete signal after production of said control signal, said earlier phase difference becoming a first phase difference between said reception modulated signal and first timing signal immediately before production of said control signal, said later phase difference becoming a second phase difference between said reception modulated signal and said second timing signal;
   said second timing signal generator comprising a voltage controlled oscillator.

* * * * *

UNITED STATES PATENT AND TRADEMARK OFFICE
CERTIFICATE OF CORRECTION

PATENT NO. : 4,849,997

DATED : July 18, 1989

INVENTOR(S) : Suzuki, et al

It is certified that error appears in the above-identified patent and that said Letters Patent is hereby corrected as shown below:

Column 1, line 10 delete "difital" and insert --digital--;

Column 1, line 64, delete first occurrence of "in" and insert --is--;

Column 2, line 41, delete "trnasmission: and insert --transmission--,

Column 3, line 20, after "timing" insert --signal--;

Column 3, line 29, delete "regeneratot" and insert --regenerator--;

Column 4, line 68 delete "infromation" and insert --information--;

Column 5, line 64 delete "54" and insert --45--;

Column 6, line 2, delete "generatot" and insert --generator--;

UNITED STATES PATENT AND TRADEMARK OFFICE
CERTIFICATE OF CORRECTION

PATENT NO. : 4,849,997

DATED : July 18, 1989

INVENTOR(S) : Suzuki, et al.

It is certified that error appears in the above-identified patent and that said Letters Patent is hereby corrected as shown below:

Column 7, line 36 delete "becoses" and insert --becomes--;

Signed and Sealed this

Twelfth Day of June, 1990

*Attest:*

HARRY F. MANBECK, JR.

*Attesting Officer*         *Commissioner of Patents and Trademarks*